(12) United States Patent
Watson et al.

(10) Patent No.: US 10,439,980 B2
(45) Date of Patent: Oct. 8, 2019

(54) CROSS-MESSAGING IDENTITY MAPPING

(71) Applicant: NCR Corporation, Duluth, GA (US)

(72) Inventors: Patrick Goode Watson, Johns Creek, GA (US); Yehoshua Zvi Licht, Alpharetta, GA (US); Nir Veltman, Johns Creek, GA (US); Brent Vance Zucker, Roswell, GA (US)

(73) Assignee: NCR Corporation, Atlanta, GA (US)

( * ) Notice: Subject to any disclaimer, the term of this patent is extended or adjusted under 35 U.S.C. 154(b) by 194 days.

(21) Appl. No.: 15/251,708

(22) Filed: Aug. 30, 2016

(65) Prior Publication Data
US 2018/0063071 A1 Mar. 1, 2018

(51) Int. Cl.
*G06F 15/16* (2006.01)
*H04L 12/58* (2006.01)
*H04L 29/08* (2006.01)

(52) U.S. Cl.
CPC .............. *H04L 51/36* (2013.01); *H04L 51/04* (2013.01); *H04L 67/14* (2013.01); *H04L 67/306* (2013.01)

(58) Field of Classification Search
CPC ......... H04L 51/04; H04L 51/36; H04L 67/14; H04L 67/306
See application file for complete search history.

(56) References Cited

U.S. PATENT DOCUMENTS

| | | | | |
|---|---|---|---|---|
| 2006/0059240 | A1* | 3/2006 | Qin | H04L 29/12594 709/207 |
| 2008/0244014 | A1* | 10/2008 | Britton | H04L 51/36 709/206 |
| 2011/0313847 | A1* | 12/2011 | Cao | G06Q 30/02 705/14.43 |
| 2012/0109734 | A1* | 5/2012 | Fordyce, III | G06Q 20/10 705/14.25 |
| 2014/0359027 | A1* | 12/2014 | Pujare | H04L 51/36 709/206 |

\* cited by examiner

*Primary Examiner* — Padma Mundur
(74) *Attorney, Agent, or Firm* — Schwegman, Lundberg & Woessner

(57) ABSTRACT

A user identifier to a user is received over a messaging platform. The user identifier is mapped to a user identity that includes an identity mapping to a plurality of other user identifiers for the user that are used over other messaging platforms by the user.

16 Claims, 6 Drawing Sheets

CROSS-MESSAGING IDENTITY MAPPING

BACKGROUND

Individuals and businesses utilize a variety of messaging technologies to: socialize, communicate, and engage in business activities. Some of these messaging technologies include: email platforms, text platforms, instant messaging platforms, browser-based platforms, and a variety of social media platforms. Each specific type of messaging platform has its own set of interfaces and features, some of which may be device-type specific or may work better (with more features) on a given device type. Furthermore, most messaging platforms include their own Application Programming Interfaces (APIs) that permit automated and program-based interaction with features of the messaging platforms.

As a result, businesses have little useful metrics as to how consumers are using messaging platforms to engage in activities with the businesses beyond direct interactions between an individual and a business over a specific messaging platform. The problem with this is that the messaging activity by an individual prior to that individual engaging a business is essentially unknowable with present technology and technology approaches.

Moreover, when an individual is engaged in an active session with a messaging platform from which a business has never had activity with the individual before, the business has no way of reaching out to the individual for purposes of offering services or for purposes of engaging in business activity with the individual. This is true, even when the individual would otherwise be known to the business and accessible to the business over a different messaging platform for which the business has engaged the individual previously.

A business only sees a small portion of a consumer's journey (activity from start to finish) that leads to business engagement through messaging technology. The journey can span multiple different messaging platforms, and the journey is rich with metrics that would permit the business to better engage, market, and understand the consumer and the consumer's journeys.

SUMMARY

In various embodiments, methods and a system for cross-messaging identity mapping are presented.

According to an embodiment, a method for cross-messaging identity mapping is provided. Specifically, a user identifier is received for a user during a user session with a messaging platform. The user identifier is mapped to at least one other user identifier of the user associated with a second messaging platform.

DETAILED DESCRIPTION

Figure 1A:
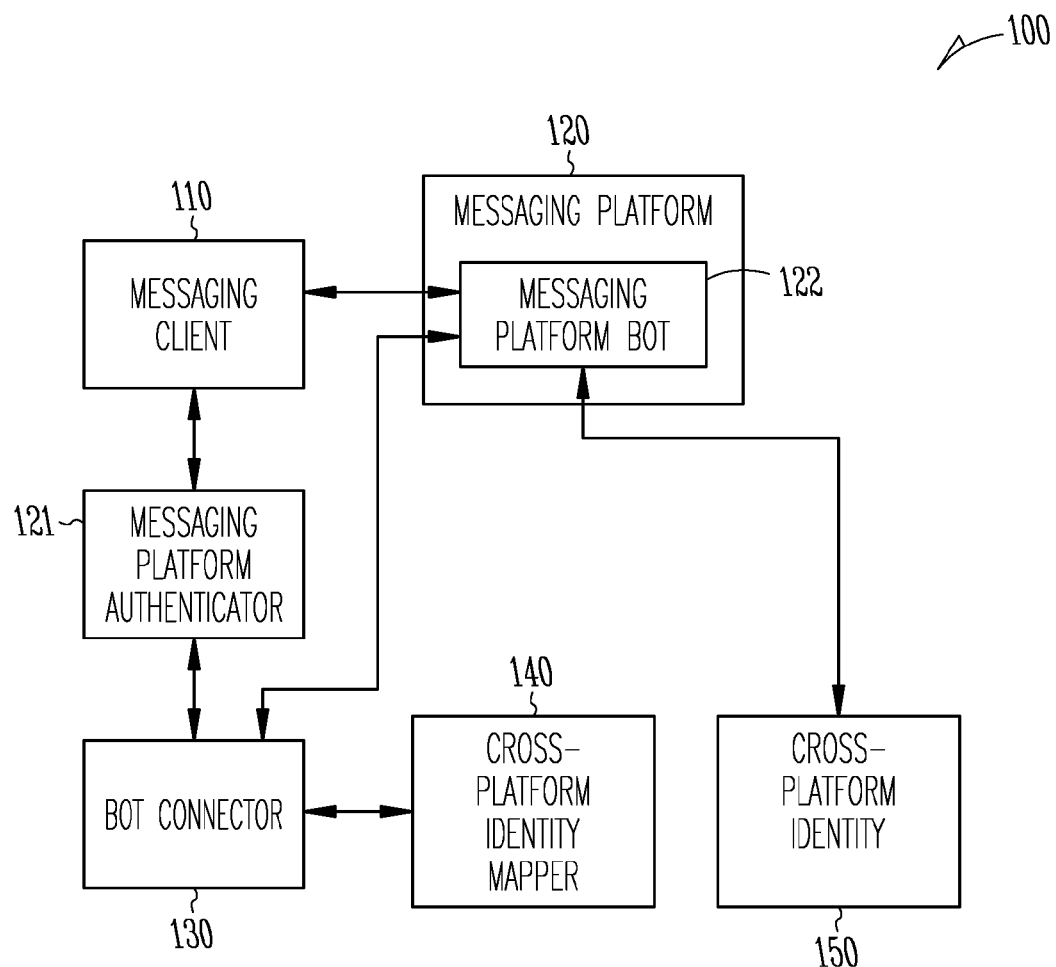
FIG. 1A is a diagram of a system for cross-messaging identity mapping, according to an example embodiment.

FIG. 1A is a diagram of a system 100 for cross-messaging identity mapping, according to an example embodiment. The system 100 is shown schematically in greatly simplified form, with only those components relevant to understanding of one or more embodiments (represented herein) being illustrated. The various components are illustrated and the arrangement of the components is presented for purposes of illustration only. It is to be noted that other arrangements with more or less components are possible without departing from the cross-messaging identity mapping techniques presented herein and below.

Moreover, various components are illustrated as one or more software modules, which reside in non-transitory storage and/or hardware memory as executable instructions that when executed by one or more hardware processors perform the processing discussed herein and below.

The techniques, methods, and systems presented herein and below for cross-messaging identity mapping can be implemented in all, or some combination of the components shown in different hardware computing devices having one or more hardware processors.

The system 100 includes: a messaging client 110, a messaging platform 120, a bot connector 130, a cross-platform identity mapper 140, and a cross-platform integrator 150. The messaging platform 120 includes a messaging platform authenticator 121 and a messaging platform bot 122.

The messaging client 110 can be processed on any processor-enabled device, such as but not limited to: a desktop computer, a laptop computer, a mobile phone, a tablet, a wearable processing device (watch, goggles, etc.), a processor-enabled vehicle interface within a vehicle, an intelligent appliance (light switch, lamp, garage door opener, refrigerator, television, stereo, etc.), a server, etc.

As used herein, a "messaging platform" refers to the software, interfaces, APIs, processing devices, and network connectivity used to perform messaging communications by users. A messaging platform includes, by way of example only, email, Short Message Service (SMS) text, instant message, and social-media applications (e.g., Facebook™, Slack™, Twitter™, Instagram™, Snap Chat™, LinkedIn™, etc.).

As used herein, a "messaging bot" of "bot" refers to a software application that is designed to engage in messaging activities in an automated manner as an active or passive participant within a specific messaging platform. A messaging bot is a logical participant in a given chat session (messaging session or dialogue). Moreover, a messaging bot is configured to perform a variety of pre-configured automated actions within its messaging platform and/or outside its messaging platform.

In an embodiment, the messaging client 110 (is also referred to as a "messaging application (app)" 110) includes no software changes or modifications for its corresponding messaging platform bot 122 bot to be operational and perform the processing discussed herein and below. That is, from the perspective of the messaging platform and the messaging app 110, the messaging platform bot 122 (also referred to as "messaging bot 122 or bot 122, herein) is a real user or participant (albeit the bot 122 is a logical participant.

In an embodiment, it is to be noted that the bot 122 need not processing on a same device as the corresponding messaging app 110. So, all a user operating messaging app 110 need do is identify a participant of a chat session (initiated with messaging app 110) as being messaging bot 110 (by directing a message within the messaging app 110 to a unique participant identifier associated with the bot 122). The actually device that executes the bot 122 can be a server or cloud (set of logically cooperating servers).

In some embodiments, the bot may process within the local processing contexts and on the devices that process the corresponding messaging apps 110.

One benefit by retaining the bot 122 in a cloud processing environment is that any updates and enhancements to the bot 122 can be achieved without updates to the devices having the messaging app 110. Furthermore, a single base version of the bot 122 can exist in the cloud and support multiple disparate users through use of user-customization profiles that include user-specific configurations of the bots 122. In this manner, when a specific user identifies the bot 122 in the messaging app 110, a cloud service can cause the base bot to be initiated and apply the that user's specific preferences/configurations to create a running instance of the bot 122 that is specific to the user.

The bot 122 is specific to its messaging platform 120. This means the bot 122 responds to messages within the messaging platform format of the platform 120 and utilizes an Application Programming Interface (API) processed by the platform 120 to perform actions and features available within the platform 120.

It is noted that a plurality of customized bots is provided with each bot customized to operate within the context of its messaging platform. For ease of illustration only a single messaging platform 120 and bot 122 is shown in the FIG. 1A.

The system 100 permits identity mapping of a user across cross-messaging platforms. This identity mapping permits cross-platform interaction and cross-platform access and engagement with the user through the bots.

Initially, a user accesses messaging client 110 and is promoted for a user-identifier and credential (such as a password, fingerprint, etc.) by the messaging platform authenticator 121. The messaging platform authenticator 121 authenticates the user for access to the user's account with the messaging platform 120.

When the user is logged in successfully to the messaging platform 120, the event of successful login, an automated message sent from the messaging app 100, or the user sent message through the messaging app 110 is detected or received by a bot connector 121.

The bot connector 130 has access to at least two pieces of information from the user: an event or an assumption that an event existed indicating that the user is successfully logged into the messaging platform 120, and a user identifier, which the user is identified by within the messaging platform 120.

The user identifier for the messaging platform 120 is sent by the bot connector 130 to a cross-platform identity mapper 140. The cross-platform identity mapper 140 searches an index for the user identifier, if no results are found, then the cross-platform identity mapper 140 sends a message back to the bot connector 130 that the user is unrecognized for cross-platform identification with the bot 122 within messaging platform 120. This is relayed to the user (perhaps through the bot 122) as to the user within the messaging platform. The relayed message also requests that the user send back an email and/or phone number of some other commonly used information that is unique to the user. The user response is received back from the bot 122, relayed through the bot connector 130 to the cross-platform identity mapper 140. The cross-platform identity mapper 140 performs a second search using the identifying information supplied by the user in the response message.

Assuming a match is detected by the cross-platform identity mapper 140 on the response message, the cross-platform identity mapper 140 retrieves from storage, database, and/or file known and retains identity mappings for the user. These identity mappings link the user to other messaging platforms (different from the messaging platform 120) and, may also, link the user to known accounts with user-services, such as retail establishments, banking establishments, gaming establishments, sporting teams, and any known account for the user-services.

In an embodiment, the cross-platform identity mapper 140 assigns a token or provides an identifier that uniquely identifies the known accounts or identities for the user. This is provided back to the bot 122, and the bot 122 sends a message to the user through the messaging platform 120 indicating that the user is known and registered for cross-platform tracking and integration services available through a cross-platform integrator 150 service.

The cross-platform integrator service 150 permits other bots from other messaging platforms to identify the activity that the user is engaged in during the chat session with the bot 122 within the messaging platform 120. This is done because the bot 122 normalizes and records activity between the bot 122 and the user in a centralized store that the bots from the other messaging platforms have access to and can identify as being associated with a user-identity known to those other bots based on the token or identifier supplied from the cross-platform identity mapper 140 (which the bot 122 also records with the user activity).

Separately, automated retail services may engage bot 122 or the other bars to achieve integration and tracking with the user's chat session with bot 122 over messaging platform 120. Again, the unique token or identifier permits these retail services to associate and link the user to a specific retail account (as was discussed above with the processing actions of the cross-platform identity mapper 140).

Accordingly, a variety of novel services can be provided to the user during the chat session and/or transactions with the retailer. Moreover, the retail can achieve a holistic view of cross-messaging platform activity of the user. This integration is achieved through the mapping of the user's messaging platform identity with other disparate and different (cross) messaging platforms and with retail identities for the user that map to retail accounts for specific retailers.

When the cross-platform identity mapper 140 is unable to match the user's messaging platform identity or the user's supplied response message identifier to any known users, the cross-platform identity mapper 140 may instruct the bot 122 to obtain registration information for the user to initially register the user for cross-messaging platform integration. The specific needed details can be pre-configured as template questions sent from the cross-platform identity mapper 140 through the bot 122 to the user and back through the bot 122 to the cross-platform identity mapper 140. In an embodiment, the user may even register a different user identity (or account) from that which is associated with the messaging platform during the registration process, such that when the user is detected by the bot connector 130 on a different messaging platform from the initial registered messaging platform 120, the cross-platform identity mapper 140 can already recognize the user on that different messaging platform.

In this manner, each time a user logs into a user-chosen messaging platform (such as 120), the user is automatically detected for cross-messaging and account integration as described above through the processing actions of the bot connector 130, the bot 122, and the cross-platform identity mapper 140 to resolve the identity mappings for the user.

As stated above, a variety of situations can be processed based on the user-identity mapping.

For example, consider a user that orders groceries from a retailer through a Slack® messaging account, the retailer can use the cross-platform integrator 150 to identify a retailer account to bill the user (or charge a registered credit card for the purchase) and credit a user loyalty account with the purchase. The retailer can then send a message through Slack® directly to the user when the groceries are ready for pick, or even send an SMS text message directly to the user when the groceries are ready for pickup. Again, the phone number for sending the SMS text message is available to the retailer or even a retail bot of the retailer through the cross-platform integrator 150. When the user/customer arrives for pick up, a Facebook™ photo of the user can be displayed on a screen of retail personnel to verify the user's identity, such that the user need not produce any documentation for receipt of the order. Because the user's various identities and accounts are aggregated (federated), any registered and federated account is accessible to the retailer systems or a retailer-customized bot.

Suppose as another example, that a user was considering but never actually consummated a purchase of an item during a session with a messaging platform 120. Subsequently, the user is detected engaged in a different session on a different messaging platform when a retailer associated with the item places the item on sale. This sale price can be automatically communicated to the user during the different session with the option to purchase.

In fact, an infinite number of scenarios are possible based on the integrated cross-messaging platform user identity aggregation and mapping.

Figure 1B:
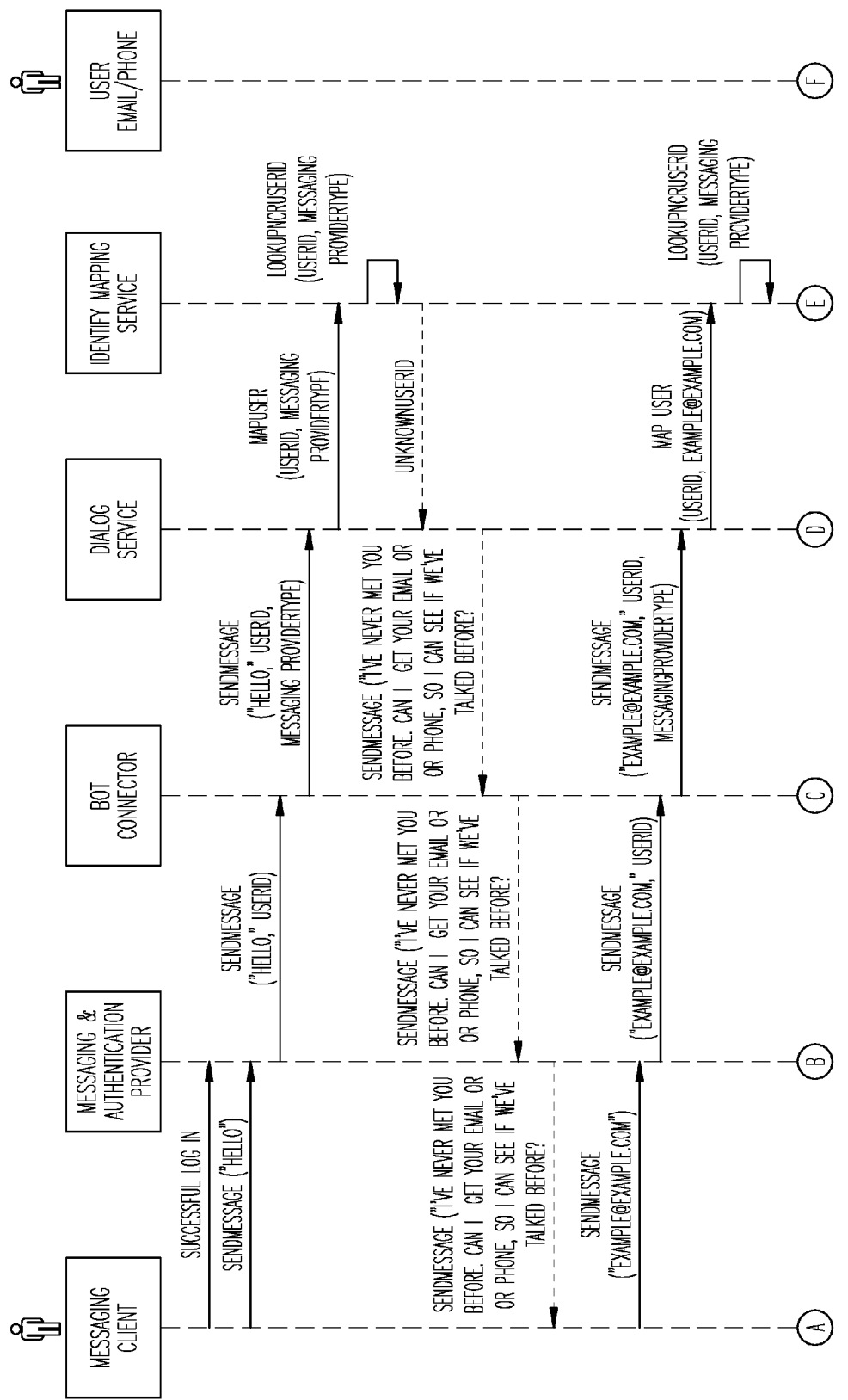
FIGS. 1B and 1C are diagrams representing a sample processing flow for cross-messaging identity mapping, according to an example embodiment.
Figure 1C:
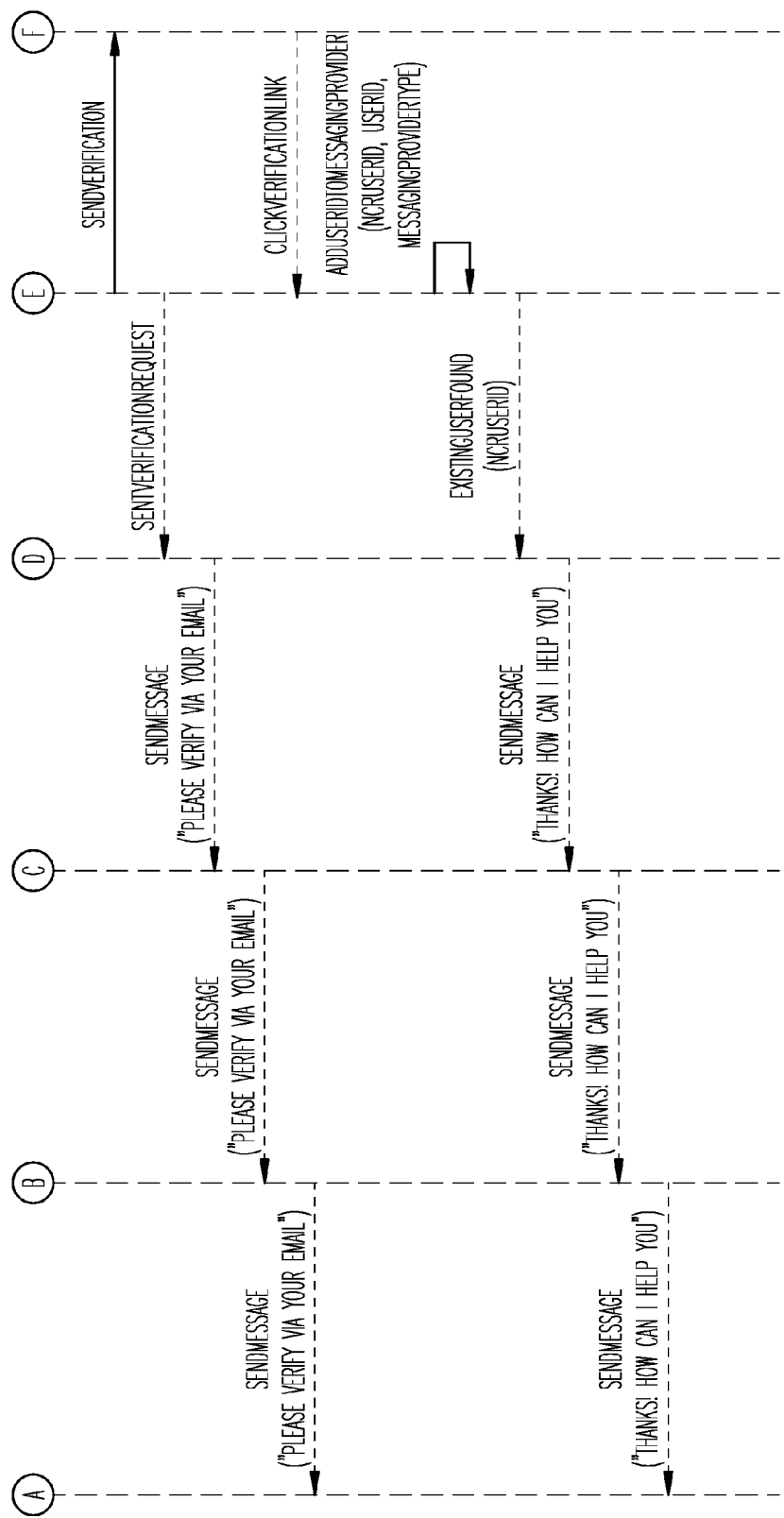

FIGS. 1B and 1C are diagrams representing a sample processing flow for cross-messaging identity mapping, according to an example embodiment.

The FIGS. 1B and 1C show a more detailed processing flow for the registration and acknowledgment of a successful user identity mapping with a particular messaging platform 120. It is noted that some components illustrated may not always be needed and as such the presented description is one embodiment.

Initially, the user accesses a messaging client 110 and is prompted to login to the user's existing account with a messaging platform 120 through a message and authentication provider 121 of the messaging platform. After successful login to the messaging platform 120, the messaging client 110 sends an automated "Hello message" back through the provided 121, which is forwarded to the bot connector 130 through a dialogue service to the identity mapping service (cross-platform identity mapper 140). The mapping service 140 cannot locate any mapping from the user and sends an unknown user message back to the dialogue service. The dialogue service constructs a message of "I've never met you before, can I get your email of phone so I can see if we have talked before?" This newly constructed message is forwarded to the bot connector 130 through the authentication provider 121 to the messaging client 110. In response, the user sends a reply message with the user's email back through the authentication provider 110, the bot connector 130, the dialogue service, and onto the identity mapper 140. The mapper 140 can be further configured to have the user verify the email, such as through a link sent to a registered phone of the user when the email is matched to an identity mapping for the user. A corresponding message that the verification request was sent to the phone can be forward back to the messaging client 110. When the user activates the link from the phone, a message is sent back (translated by the dialogue service) saying "Thanks! How can I help you?" This is an indication that the user's identity from the messaging platform 120 is now officially recognized by the mapper for cross-messaging platform interactions over the messaging platform 120 with all other registered identities for the user (other messaging platforms and retail accounts).

The embodiments presented in the FIGS. 1A-1C and other embodiments are now discussed with reference to the FIGS. 2-4.

Figure 2:
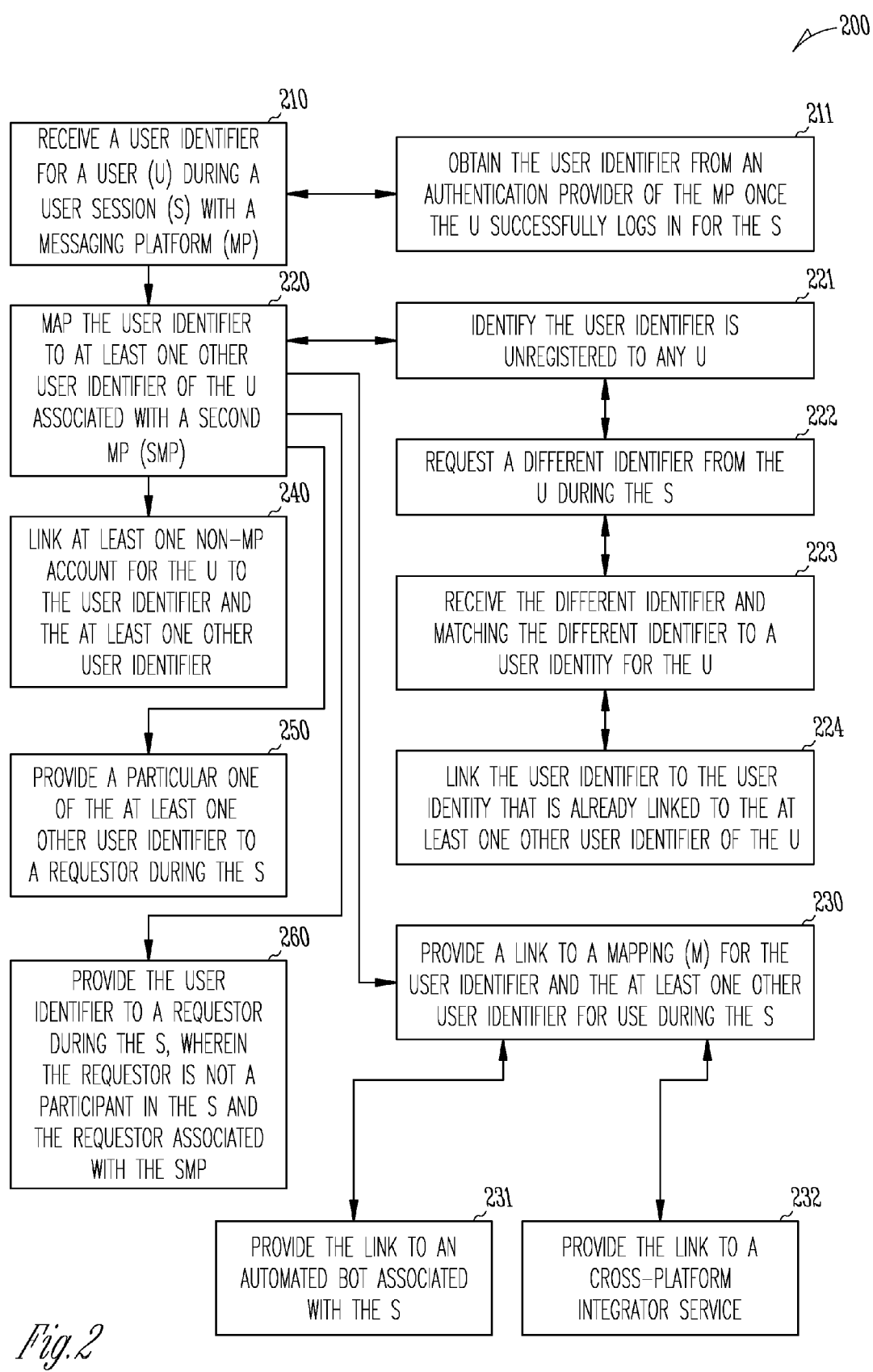
FIG. 2 is a diagram of a method for cross-messaging identity mapping, according to an example embodiment.

FIG. 2 is a diagram of a method 200 for cross-messaging identity mapping, according to an example embodiment. The software module(s) that implements the method 200 is referred to as an "cross-messaging identity mapper." The cross-messaging identity mapper is implemented as executable instructions programmed and residing within memory and/or a non-transitory computer-readable (processor-readable) storage medium and executed by one or more hardware processors of a hardware computing device. The processors of the device that executes the cross-messaging identity mapper are specifically configured and programmed to process the cross-messaging identity mapper. The cross-messaging identity mapper has access to one or more networks during its processing. The networks can be wired, wireless, or a combination of wired and wireless.

In an embodiment, the device that executes the cross-messaging identity mapper is the device or set of devices that process in a cloud processing environment.

In an embodiment, the device that executes the messaging integrator is a server.

In an embodiment, the cross-messaging identity mapper is the cross-platform identity mapper 140.

At 210, the cross-messaging identity mapper receives a user identifier for a user during a user session with a messaging platform. That is, a user establishes a communication session with a messaging service through authentication with the messaging platform and the cross-messaging identity mapper receives a user identifier that the user is known by within the messaging platform. A messaging platform can include, but is not limited to: a text message service, a social-media service, an instant messaging service, an email service, and the like.

According to an embodiment, at 211, the cross-messaging identity mapper obtains the user identifier from an authentication provider of the messaging platform once the user successfully logs in for the user session with the messaging platform. In an embodiment, the authentication provider is the messaging platform authenticator 121.

At 220, the cross-messaging identity mapper maps the user identifier to at least one other user identifier of the user associated with a second messaging platform. The messaging platform associated with the user session is different than the second messaging platform. The user identifier for use within the messaging platform is different than the mapped additional user identifier.

In an embodiment, at 221, the cross-messaging identity mapper identifies the user identifier (initially) as being unregistered or unknown to the cross-messaging identity mapper for the user.

In an embodiment of 221 and at 222, the cross-messaging identity mapper requests a different identifier from the user during the session with the messaging platform. That is, the user accesses a messaging-specific interface as a result of a receiving a message request within the messaging-specific interface to supply a different identifier for the user that is different than the user identifier known for the user within the session with the messaging platform. The interface may be messages sent to the user and received from the user within the messaging platform. In an embodiment, the different identifier is an email for the user or a phone number for the user.

In an embodiment of 222 and at 223, the cross-messaging identity mapper receives the different identifier back as a response message generated by the user within the messaging platform. The cross-messaging identity mapper matches that different identifier for the user to a user identity known to the cross-messaging identity mapper (the different identifier is searched for in a data store and the user identity is returned as a result of the search, which indicates that the user is known to the cross-messaging identity mapper).

In an embodiment of 223 and 224, the cross-messaging identity mapper links the user identifier to the user identity. The user identity is already linked within the data store to the at least one other user identifier of the user for the second messaging platform.

According to an embodiment, at 230, the cross-messaging identity mapper provides a link to a mapping for the user identifier and the at least one other user identifier. The link may be provided without any request to specific entities with interest in the session or may be provided in response to being requested by a requester. The link provides a mechanism for linking the user session and user identifier for the session to the at least one other user identifier associated with the second messaging platform.

In an embodiment of 230 and at 231, the cross-messaging identity mapper provides the link to an automated bot associated with the user session with the messaging platform. In an embodiment, the automated bot is bot 122. In an embodiment, the cross-messaging identity mapper dynamically pushes the link without a request to the automated bot. In an embodiment, the cross-messaging identity mapper supplies the link when requested by the automated bot.

In an embodiment of 230 and at 232, the cross-messaging identity mapper provides the link to a cross-platform integration service. In an embodiment, the cross-platform integration service is the cross-platform integrator 150. In an embodiment, the cross-messaging identity mapper dynamically pushes the link to the cross-platform integration service without having received any request. In an embodiment, the cross-messaging identity mapper supplies the link when requested (on demand) by the cross-platform integration service.

According to an embodiment, at 240, the cross-messaging identity mapper links at least one non-messaging platform account for the user to the user identifier and the at least one other user identifier. So, the identity mapping that spans multiple messaging platforms (with each user identifier in the identity mapping being associated with a user identifier that the user is known by within a specific messaging platform) can include accounts known for the user with retailers, banking intuitions, governmental services, etc.

In an embodiment, at 250, the cross-messaging identity mapper provides a particular one of the at least one other user identifiers to a requestor during the session. In an embodiment, the requestor is authenticated for access to ensure proper permissions in requesting the specific user identifier.

In an embodiment, at 260, the cross-messaging identity mapper provides the user identifier to a requestor during the session between the user and the messaging platform. The requestor is not an active participant in the session and is not logged in for access to the messaging platform. The requestor associated with the second messaging platform.

One now appreciates how a user can be automatically registered for cross-messaging platform services as soon as the user logs into a particular messaging platform in a session with that messaging platform using a messaging-platform specific user identifier for the user. This permits a variety of cross-platform services and integration some of which were discussed above with the discussions of the FIGS. 1A-1B.

Figure 3:
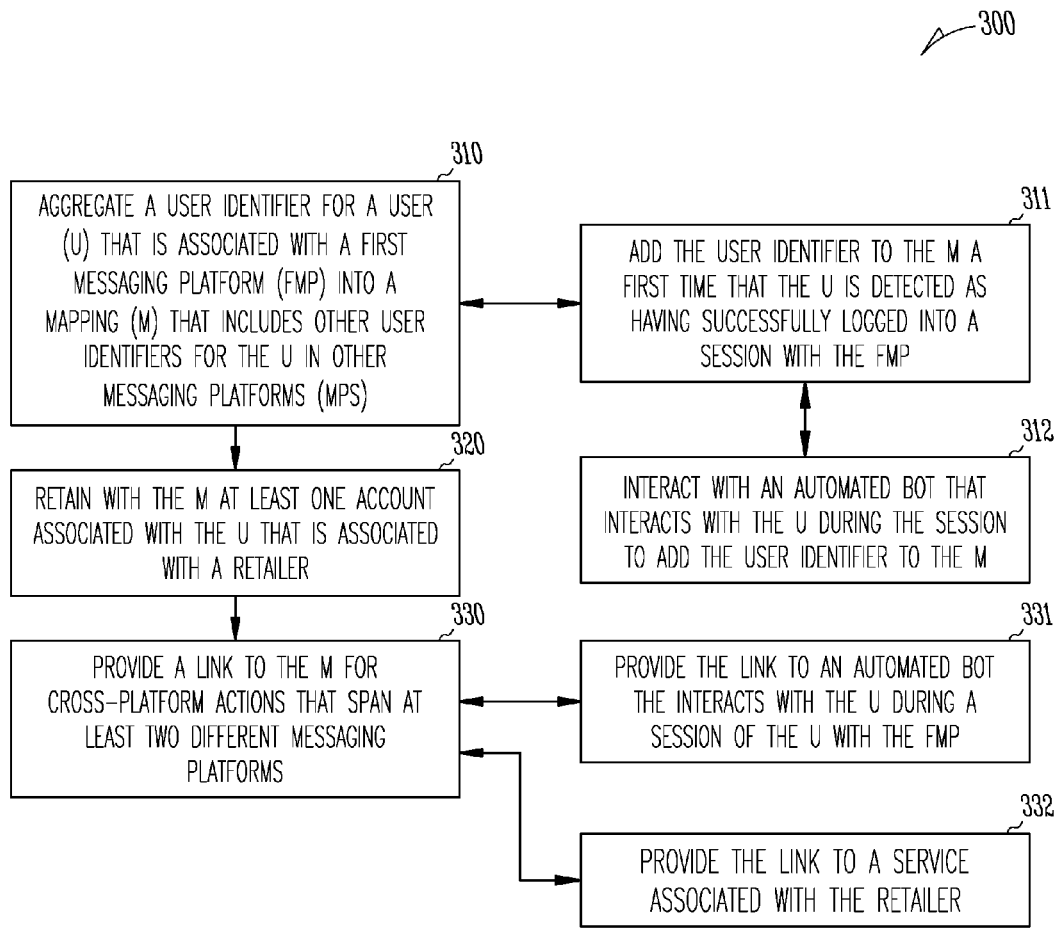
FIG. 3 is a diagram of another method for cross-messaging identity mapping, according to an example embodiment.

FIG. 3 is a diagram of another method 300 for cross-messaging identity mapping, according to an example embodiment. The software module(s) that implements the method 300 is referred to as an "identity mapper." The identity mapper is implemented as executable instructions programmed and residing within memory and/or a non-transitory computer-readable (processor-readable) storage medium and executed by one or more hardware processors of a hardware device. The processors of the device that executes the identity mapper are specifically configured and programmed to process the identity mapper. The identity mapper has access to one or more networks during its processing. The networks can be wired, wireless, or a combination of wired and wireless.

The identity mapper presents another and in some ways enhanced perspective of the method 200.

In an embodiment, the identity mapper is the method 200.

In an embodiment, the identity mapper is the cross-platform identity mapper 140.

In an embodiment, the identity mapper is some or all of the bot connector 120, the cross-platform identity mapper 140, and/or the cross-platform integrator 150

In an embodiment, the device that executes the identity mapper is a server.

In an embodiment, the device that executes the identity mapper is a cloud processing environment.

At 310, the identity mapper aggregates a user identifier for a user that is associated with a first messaging platform into a mapping that includes other user identifiers for the user in other messaging platforms. That is, the mapping includes an aggregation of user identifiers. Each user identifier is used by the user to be uniquely recognized as a registered user having a registered account with a specific one of the messaging platforms.

In an embodiment, at 311, the identity mapper adds the user identifier to the mapping at a time when the user is first detected as having successfully logged into a session with the first messaging platform. So, the first time the user logs into his/her account within the first messaging platform (after the identity mapper has been enabled), the user identifier is added to the mapping for the user.

In an embodiment of 311 and at 312, the identity mapper interacts with an automated bot, which interacts with the user during the session with the first messaging platform to add the user identifier to the identity mapping for the user. In an embodiment, the automated bot is the bot 122.

At 320, the identity mapper retains with the mapping at least one account associated with the user that is associated or link to a specific retailer. That is, in addition to user identifiers being mapped within the mapping, the identity mapper maps and associates non-messaging platform accounts identifiers (credit card, retail, loyalty, gift cards, banking cards, etc.).

At 330, the identity mapper provides a link to the mapping for cross-messaging platform actions that span at least two different messaging platforms. Example types of actions were discussed above with the discussion of the FIGS.

1A-1C. In an embodiment, this is achieved in cooperation with the identity mapper and one or more of: the bot 122, the cross-platform integrator 150, and/or retail-facing interfaces for interacting with retail services.

In an embodiment, at 331, the identity mapper provides the link to an automated bot that interacts with the user during the session with the first messaging platform. In an embodiment, the automated bot is the bot 122.

In an embodiment, at 332, the identity mapper provides the link to a service associated with the retailer.

Figure 4:
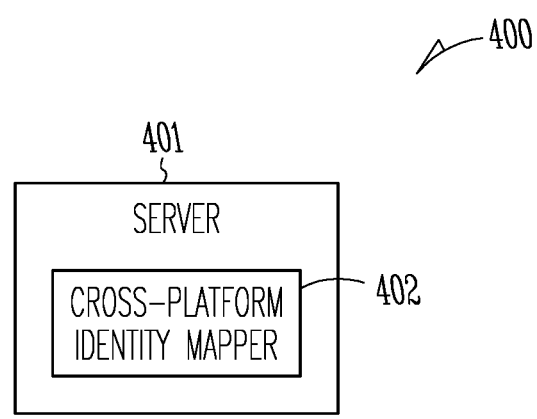
FIG. 4 is a diagram of a cross-mapping identity mapping system, according to an example embodiment.

FIG. 4 is a diagram of a cross-mapping identity mapping system 400, according to an example embodiment. The system 400 includes a variety of hardware components and software components. The software components of the system 400 are programmed and reside within memory and/or a non-transitory computer-readable medium and execute on one or more hardware processors of a hardware device. The system 400 communicates one or more networks, which can be wired, wireless, or a combination of wired and wireless.

In an embodiment, the system 400 implements all or some combination of the processing discussed above with the FIGS. 1A-1C and 2-3.

In an embodiment, the system 400 implements, inter alia, the method 200 of the FIG. 2.

In an embodiment, the system 400 implements, inter alia, the method 300 of the FIG. 3.

The system 400 includes a server 401 and the server including a cross-platform identity mapper 402.

Cross-platform identity mapper 402 is configured to: 1) execute on at least one hardware processor of the server 401; 2) add a user identifier for a user to an identity mapping for the user when the user is logged into a session with a messaging platform, and wherein the identity mapping includes other user identifiers for the user with other messaging platforms, and 3) provide a link to the identity mapping during the session.

In an embodiment, the cross-platform identity mapper 402 is further configured to: provide the link to a requestor outside the session. The link can be provided by actively sending the link to a requestor that is not engage in the session or with the messaging platform. Moreover, the link can be provided passively by providing an interface for a requestor to locate and access the link from within the messaging platform but not engaged in the session, or outside the messaging platform.

In an embodiment, the cross-platform identity mapper 402 is further configured to: associate at least one retail account with the mapping, wherein the at least one retail account is independent of the messaging platform and the other messaging platforms. So, the cross-platform identity mapper 402 can provide details for accessing account details of the retail account to a requester for performing a transaction with the user during the session or outside the session and within the messaging platform or outside the messaging platform.

In an embodiment, the cross-platform identity mapper 402 is the cross-platform identity mapper 140.

In an embodiment, the cross-platform identity mapper 402 is the method 200.

In an embodiment, the cross-platform identity mapper 402 is the method 300.

In an embodiment, the cross-platform identity mapper 402 is all or some combination of the cross-platform identity mapper 140, the method 200, and the method 300.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
    detecting an event indicating a user has successfully logged onto a messaging platform;
    receiving a user identifier for the user during a user session with the messaging platform;
    mapping the user identifier to a second user identifier of the user associated with a second messaging platform;
    providing a notification of the user session in the messaging platform and the second user identifier to an automated bot processing in the second messaging platform;
    tracking actions performed by the user during the user session and providing additional notifications for the actions to the second messaging platform during the user session;
    obtaining a message from the automated bot directed to the user engaged in the user session with the messaging platform;
    translating the message from a second messaging platform format associated with the second messaging platform into a messaging platform format associated with the messaging platform; and
    delivering the message in the messaging platform format to the user during the user session.

2. The method of claim 1, wherein mapping further includes identifying the user identifier as unregistered to any user.

3. The method of claim 2 further comprising, requesting a third user identifier from the user during the user session that is different from the user identifier and the second user identifier.

4. The method of claim 3 further comprising, receiving the third user identifier and matching the third user identifier to a user identity for the user.

5. The method of claim 4 further comprising, linking the user identifier to the user identity that is already linked to the second user identifier and third user identifier of the user.

6. The method of claim 1 further comprising, providing a link to a mapping for the user identifier and the at least one second user identifier for use during the user session by a second automated bot that processes within the messaging platform.

7. The method of claim 6, wherein providing further includes providing the link to a cross-platform integrator service.

8. The method of claim 1 further comprising, linking at least one non-messaging platform account for the user to the user identifier and the second user identifier.

9. A method, comprising:
aggregating a user identifier for a user that is associated with a first messaging platform into a mapping that includes other user identifiers for the user in other messaging platforms;
retaining with the mapping at least one account associated with the user that is associated with a retailer;
providing a link to the mapping for cross-platform actions that span at least two different messaging platforms by sending the link to automated bots processing in the at least two different messaging platforms permitting the at least one account to be accessed and the cross-platform actions to be processed by the automated bots on behalf of the user over the first messaging platform and the at least two different messaging platforms;
tracking first actions performed by the user during a session with the first messaging platform and providing notifications for the actions to the automated bots during the session;
obtaining a message from a particular automated bot associated with a particular different messaging platform that is different from the first messaging platform, wherein the message is directed to the user engaged in the session with the first messaging platform;
translating the message from a messaging platform format associated with the particular different messaging platform into a first messaging platform format associated with the first messaging platform; and
delivering the message in the first messaging platform format to the user during the session.

10. The method of claim 9, wherein aggregating further includes adding the user identifier to the mapping a first time that the user is detected as having successfully logged into a first session with the first messaging platform.

11. The method of claim 10, wherein adding further includes interacting with at least one of the automated bots that interacts with the user during the first session to add the user identifier to the mapping.

12. The method of claim 9, wherein providing further includes providing the link to a first messaging platform automated bot that interacts with the user during the session of the user with the first messaging platform.

13. The method of claim 9, wherein providing further includes providing the link to a service associated with the retailer.

14. A system, comprising:
a server comprising a hardware processor and a non-transitory computer-readable storage medium having executable instructions; and
the executable instructions when executed by the hardware processor from the non-transitory computer-readable storage medium cause the hardware processor to:
add a user identifier for a user to an identity mapping for the user when the user is logged into a session with a messaging platform, and wherein the identity mapping includes other user identifiers for the user with other messaging platforms;
provide a link to the identity mapping during the session to a plurality of automated bots, at least one of the automated bots processing within the messaging platform and some of the automated bots processing in the other messaging platforms;
track actions performed by the user during the session and provide notifications for the actions to the automated bots processing in the other messaging platforms during the user session;
obtain a message from a particular automated bot processing in a particular other messaging platform, wherein the message is directed to the user engaged in the session with the messaging platform;
translate the message from a particular other messaging platform format associated with the particular other messaging platform into a messaging platform format associated with the messaging platform; and
deliver the message in the messaging platform format to the user during the session.

15. The system of claim 14, wherein the executable instructions executable instructions when executed by the hardware processor from the non-transitory computer-readable storage medium cause the hardware processor to: provide the link to a particular automated bot outside the session.

16. The system of claim 14, wherein the executable instructions executable instructions when executed by the hardware processor from the non-transitory computer-readable storage medium cause the hardware processor to: associate at least one retail account with the mapping, wherein the at least one retail account is independent of the messaging platform and the other messaging platforms.

* * * * *